United States Patent
Seo et al.

(10) Patent No.: US 8,507,610 B2
(45) Date of Patent: Aug. 13, 2013

(54) MODIFIED POLYMER MATERIAL MODIFIED BY NITRILE OXIDE, AND PRODUCTION METHOD THEREOF

(75) Inventors: Akishige Seo, Aichi-ken (JP); Hideyuki Imai, Aichi-ken (JP); Naoki Iwase, Aichi-ken (JP); Toshikazu Takata, Tokyo (JP); Yasuhito Koyama, Tokyo (JP)

(73) Assignees: Toyoda Gosei Co., Ltd., Aichi-pref. (JP); Tokyo Institute of Technology, Tokyo (JP)

( * ) Notice: Subject to any disclaimer, the term of this patent is extended or adjusted under 35 U.S.C. 154(b) by 304 days.

(21) Appl. No.: 12/659,128

(22) Filed: Feb. 25, 2010

(65) Prior Publication Data

US 2011/0054134 A1  Mar. 3, 2011

(30) Foreign Application Priority Data

Aug. 31, 2009  (JP) .................... 2009-200716

(51) Int. Cl.
*C08J 3/24* (2006.01)
(52) U.S. Cl.
USPC .......... 525/329.3; 525/329.1; 525/331.7; 525/333.1; 525/376; 525/377
(58) Field of Classification Search
USPC ........... 525/377, 329.1, 329.3, 331.7, 333.1, 525/376
See application file for complete search history.

(56) References Cited

U.S. PATENT DOCUMENTS

2006/0173137 A1 * 8/2006 McGlothlin et al. ....... 525/331.9
2007/0251572 A1 * 11/2007 Hoya et al. .................... 136/256

FOREIGN PATENT DOCUMENTS

| JP | 57-12003 | * | 1/1982 |
| JP | A-S57-012003 | | 1/1982 |
| JP | 11-180943 | * | 7/1999 |
| JP | A-11-180943 | | 7/1999 |
| JP | A-2007-224076 | | 9/2007 |
| JP | A-2008-163232 | | 7/2008 |

OTHER PUBLICATIONS

Koyama et al., 89th Annual Meeting of Chemical Society of Japan, printout of Lecture 2 C1-27, Mar. 28, 2009.*
http://www.csj.jp/nenkai/89haru/data/prog-89_en.html; partial Agenda for 89th Annula Meeting of Chemical Society of Japan, Mar. 1989.*
English abstract of JP 57-12003, Jan. 1982.*
Tada et al., Journal of Applied Polymer Science, 15 (1971) 117-128.*

* cited by examiner

*Primary Examiner* — Roberto Rabago
(74) *Attorney, Agent, or Firm* — Posz Law Group, PLC

(57) ABSTRACT

The present invention provides a production method of a modified polymer material produced by modifying a polymer material having in a molecule thereof a multiple bond that reacts with a nitrile oxide, includes reacting the polymer material with an aromatic nitrile oxide derivative having a substituent at an ortho-position of a nitrile oxide group of an aromatic nitrile oxide in which the nitrile oxide group is bonded to an aromatic ring.

9 Claims, No Drawings

MODIFIED POLYMER MATERIAL MODIFIED BY NITRILE OXIDE, AND PRODUCTION METHOD THEREOF

TECHNICAL FIELD

The present invention relates to a modified polymer material in which the solubility in an organic solvent is changed, and a production method thereof.

BACKGROUND ART

A polymer material having a carbon-carbon double bond in the molecule thereof such as EPDM, NR and NBR is susceptible to degradation by sunlight (particularly ultraviolet rays) or ozone, so that a problem of weatherability may occur depending on the application. In addition, such a polymer material may be dissolved in a specific organic solvent or the like, and cannot be applied also to a site that may be contacted with such an organic solvent or the like. Therefore, as one countermeasure for extending the application of such a polymer material, there is considered a modification (chemical modification) by a nitrile oxide.

On the other hand, it has been known from long ago that a nitrile oxide which is one of representative 1,3-dipoles, is reacted with a monomer of alkene or alkyne, a monomer of nitrile compounds and the like under a moderate condition. However, a nitrile oxide is, because of its high reactivity, gradually dimerized in a non-polar solvent to be converted to furoxane, so that the isolation and the preservation of a nitrile oxide is difficult. Therefore, in order to perform a modification by a nitrile oxide, a method of generating a nitrile oxide in the reaction system by reacting a base such as triethylamine with halogenated aldoxime that is a precursor of a nitrile oxide becomes general.

However, by this method, when it was attempted to react a polymer material such as NBR and PAN with a nitrile oxide, the reaction hardly progressed, so that a modified polymer material modified by a nitrile oxide cannot be obtained.

Here, Japanese Patent Application Publication JP-A-11-180943 discloses a synthetic method of benzonitrile oxide derivatives such as mesitylenedinitrile oxide and mesitylenemononitrile oxide, but discloses no polymer material modified by a benzonitrile oxide derivative.

In addition, Japanese Patent Application Publication JP-A-2008-163232 discloses that by using a compound having a heterocycle such as 4-(2-oxazolyl)-phenyl-N-phenylnitrone and 4-(2-oxazolyl)-phenyl-N-methylnitrone, a diene-based copolymer rubber is kneaded and reacted in cyclohexane, but discloses no polymer material modified by an aromatic nitrile oxide having a substituent at an ortho-position.

CITATION LIST

Patent Literature

Japanese Patent Application Publication No. JP-A-11-180943

Japanese Patent Application Publication No. JP-A-2008-163232

SUMMARY OF INVENTION

Technical Problem

In view of the above, it is an object of the present invention to provide a modified polymer material in which the solubility of the material in an organic solvent is changed by modifying the material with a nitrile oxide, and a production method thereof.

Solution to Problem

In order to solve the problems described above, according to a first aspect of the invention, a production method of a modified polymer material produced by modifying a polymer material having in a molecule thereof a multiple bond that reacts with a nitrile oxide, includes reacting the polymer material with an aromatic nitrile oxide derivative having a substituent at an ortho-position of a nitrile oxide group of an aromatic nitrile oxide in which the nitrile oxide group is bonded to an aromatic ring.

In order to solve the problems described above, according to a second aspect of the invention, a modified polymer material is produced by modifying a polymer material having in a molecule thereof a multiple bond that reacts with a nitrile oxide, with an aromatic nitrile oxide derivative having a substituent at an ortho-position of a nitrile oxide group of an aromatic nitrile oxide in which the nitrile oxide group is bonded to an aromatic ring.

Exemplary forms of each element in the present invention are shown below.

1. Polymer Material

The multiple bond of the polymer material is not particularly limited. Examples thereof include $C=S$, $N=N$, $P(V)=C$, $C=As$, $C=C$, $C=N$, $C=Se$, $B=N$, $C=P$, $C=C$, $P(V)=N$, $C=N$ and $C=O$.

The polymer material is not particularly limited. Examples thereof include: polyacrylonitrile (PAN) having in the molecule thereof, a nitrile group ($C=N$); natural rubber (NR) having in the molecule thereof, a carbon-carbon double bond ($C=C$); ethylene-propylene-diene copolymer rubber (EPDM); and nitrile rubber (NBR) having in the molecule thereof, a nitrile group and a carbon-carbon double bond.

2. Aromatic Nitrile Oxide Derivative

Although the aromatic nitrile oxide derivative is not particularly limited, an aromatic nitrile oxide derivative having substituents at every ortho-position of nitrile oxide groups of an aromatic nitrile oxide is preferred.

Although the aromatic nitrile oxide in which a nitrile oxide group is bonded to an aromatic ring is not particularly limited, benzonitrile oxide or naphthylnitrile oxide is preferred.

Although the substituent of the aromatic nitrile oxide derivative is not particularly limited, substituents other than a fluoro group (F), a hydroxy group (OH), an amino group ($NH_2$) and a hydro group (H) are preferred, and an alkyl group or an alkoxy group is more preferred.

Although the alkyl group of the aromatic nitrile oxide derivative is not particularly limited, a $C_{1-20}$ linear or branched alkyl group is preferred and a $C_{1-4}$ linear or branched alkyl group is more preferred. Examples of the $C_{1-4}$ linear or branched alkyl group include a methyl group, an ethyl group, an n-propyl group, an iso-propyl group, an n-butyl group, a sec-butyl group, an iso-butyl group and a tert-butyl group.

Although the alkoxy group of the aromatic nitrile oxide derivative is not particularly limited, a $C_{1-4}$ linear or branched alkoxy group is preferred and a $C_{1-3}$ linear or branched alkoxy group is more preferred. Examples of the $C_{1-3}$ linear or branched alkoxy group include a methoxy group, an ethoxy group, an n-propoxy group and an iso-propoxy group.

Although the additive amount of the aromatic nitrile oxide derivative to the polymer material is not particularly limited, 0.01 to 10 equivalents are preferred.

3. Reaction Process

Although the reaction process is not particularly limited, it is preferably performed in an organic solvent or without a solvent.

Although the organic solvent is not particularly limited, it is preferably an organic solvent that easily dissolves both of the polymer material and the aromatic nitrile oxide derivative. Specific examples of the organic solvent include chloroform and N,N-dimethylformamide (DMF).

When the reaction process is performed without a solvent, it may be performed either in an air atmosphere or in an atmosphere filled with an inert gas.

The inert gas is not particularly limited. Examples thereof include argon and nitrogen.

When the reaction process is performed without a solvent, the reaction process is preferably performed in a kneading apparatus.

The kneading apparatus is not particularly limited. Examples thereof include: kneaders such as a twin-screw kneader, an encapsulated kneader, a Banbury mixer and an intermix; and extruders such as a twin-screw extruder, a single-screw extruder and a multi-screw extruder.

The temperature for the reaction process is not particularly limited so long as it is a temperature at which the aromatic nitrile oxide derivative reacts with the polymer material. However, it is preferably 0 to 150° C. because the chemical reaction is accelerated in correspondence with the increase in temperature and the management of the production process is easier, if the temperature control such as heating is not performed. Moreover, when the polymer material has at least a carbon-carbon double bond as a multiple bond, such as NBR, NR and EPDM, the reaction temperature is more preferably 20 to 100° C., and when the polymer material has only a triple bond as a multiple bond, such as PAN, the reaction temperature is more preferably 60 to 150° C.

Advantageous Effects of Invention

According to the aspects of the present invention, a modified polymer material in which the solubility thereof in an organic solvent is changed by modifying the material with a nitrile oxide can be produced and provided.

DESCRIPTION OF EMBODIMENTS

EXAMPLES

In Examples of the present invention, modified polymer materials were produced by modifying four types of polymer materials such as PAN, NBR, NR and EPDM with three types of aromatic nitrile oxide derivatives shown as below.

In addition, in Comparative Examples, there were used a method for reacting two types of polymer materials of PAN and NBR with a halogenated aldoxime which is a precursor of a nitrile oxide and a base or the like (Comparative Examples 1 to 5) and a method for reacting PAN with an aromatic nitrile oxide derivative at room temperature (Comparative Example 6).

Production (reaction) conditions for each of Examples and Comparative Examples, the yield and the modifying rate are shown in Table 1. Here, the column of "reagent" in Table 1 indicates an aromatic nitrile oxide derivative used in the reaction and the number in parentheses indicates an additive amount (in equivalent relative to the amount of the polymer material) of each reagent. In addition, the modifying rate of NBR is described for each of a carbon-carbon double bond (diene) and a nitrile group (CN).

TABLE 1

| | | | | Reaction Condition | | | | | |
| --- | --- | --- | --- | --- | --- | --- | --- | --- | --- |
| | | | | Reaction process | | | | | |
| | Polymer Material | Reagent | Additive | in Organic Solvent | without Solvent | Reaction Temperature | Reaction Time (h) | Yield (%) | Modifying Rate (%) |
| Comparative Example 1 | PAN | A (2.0 eq.) | $Et_3N$ | DMF | — | RT | 48 | 0 (NR) | 0 |
| Comparative Example 2 | | A (2.0 eq.) | $Et_3N$ | DMF | — | 100° C. | 48 | 0 | 0 |
| Comparative Example 3 | | A (2.0 eq.) | MS 4A | DMF | — | RT | 48 | 0 | 0 |
| Comparative Example 4 | | A (2.0 eq.) | MS 4A | DMF | — | 100° C. | 48 | 0 | 0 |
| Comparative Example 5 | NBR (33% CN) | A (2.0 eq.) | $Et_3N$ | $CHCl_3$ | — | 70° C. | 48 | 0 | 0 |
| Comparative Example 6 | PAN | B (2.0 eq.) | — | DMF | — | RT | 48 | 0 | 0 |
| Example 1 | PAN | B (2.0 eq.) | — | DMF | — | 100° C. | 48 | 99 | 53 |
| Example 2 | | B (2.0 eq.) | — | DMF | — | 150° C. | 48 | 99 | 39 |
| Example 3 | | B (2.0 eq.) | — | DMF | — | 70° C. | 48 | 99 | 60 |
| Example 4 | | C (2.0 eq.) | — | DMF | — | 70° C. | 48 | 99 | 65 |
| Example 5 | | D (2.0 eq.) | — | DMF | — | 70° C. | 48 | 99 | 5 |
| Example 6 | NBR (33% CN) | B (1.2 eq.) | — | $CHCl_3$ | — | 70° C. | 24 | 99 | diene: 99 CN: 99 |
| Example 7 | | B (1.2 eq.) | — | $CHCl_3$ | — | 70° C. | 2 | 99 | diene: 87 CN: 48 |
| Example 8 | | B (0.67 eq.) | — | $CHCl_3$ | — | 70° C. | 48 | 90 | diene: 78 CN: 53 |
| Example 9 | | B (0.33 eq.) | — | $CHCl_3$ | — | 70° C. | 48 | 99 | diene: 43 CN: 5 |
| Example 10 | | B (1.2 eq.) | — | — | in air atmosphere | 70° C. | 2 | 99 | diene: 18 CN: 8 |
| Example 11 | | B (1.2 eq.) | — | — | in air atmosphere | 100° C. | 2 | 86 | diene: 76 CN: 31 |
| Example 12 | | C (1.2 eq.) | — | $CHCl_3$ | — | 70° C. | 48 | 98 | diene: 93 CN: 37 |

TABLE 1-continued

| | Polymer Material | Reagent | Additive | Reaction process in Organic Solvent | Reaction process without Solvent | Reaction Temperature | Reaction Time (h) | Yield (%) | Modifying Rate (%) |
|---|---|---|---|---|---|---|---|---|---|
| Example 13 | | C (1.2 eq.) | — | — | in air atmosphere | 70° C. | 2 | 99 | diene: 16 CN: 8 |
| Example 14 | | D (1.2 eq.) | — | CHCl₃ | — | 70° C. | 48 | 99 | diene: 57 CN: 50 |
| Example 15 | NR | B (2.0 eq.) | — | CHCl₃ | — | 70° C. | 48 | 99 | 56 |
| Example 16 | EPDM | B (1.0 eq.) | — | CHCl₃ | — | 70° C. | 84 | 96 | 70 |
| Example 17 | (10% diene) | B (2.0 eq.) | — | — | in Ar atmosphere | RT | 2 | 97 | 77 |
| Example 18 | | B (0.95 eq.) | — | — | in N₂ atmosphere twin-screw kneader | 70° C. | 1 | 96 | 16 |
| Example 19 | | D (10 eq.) | — | CHCl₃ | — | 70° C. | 48 | 99 | 63 |

In the present Examples and Comparative Examples, the following substances were used.

As the polymer material, polyacrylonitrile (PAN), nitrile rubber (NBR), natural rubber (NR) and ethylene-propylene-diene copolymer rubber (EPDM) were used. Among them, as the NBR, an NBR having a mass ratio of acrylonitrile of 33% was used and as the EPDM, an EPDM having a mass ratio of diene of 10% was used.

As the aromatic nitrile oxide derivative, 2,6-dimethoxy-benzonitrile oxide (B), 2,6-diethoxybenzonitrile oxide (C) and 2-methoxynaphthyl-1-nitrile oxide (D) were used. Chemical formulae of these derivatives are shown below. In addition, with respect to 2-methoxynaphthyl-1-nitrile oxide, the synthetic method thereof is shown.

[Chemical Formula 1]

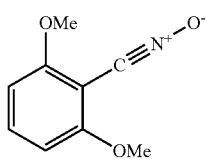

B

[Chemical Formula 2]

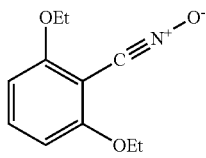

C

[Chemical Formula 3]

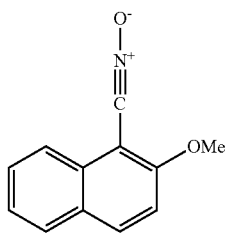

D

The synthesis of 2-methoxynaphthyl-1-nitrile oxide was performed as described in the following Chemical Formula 4.

First, 80.0 g (0.46 mol) of a commercially available compound 1 (2-hydroxy-1-naphthaldehyde) was dissolved in 500 mL of acetone. To the resultant solution, 76.5 g (0.56 mol) of $K_2CO_3$ was added and thereto, 61.7 g (0.49 mol) of $(CH_3O)_2SO_2$ was gradually added at 0° C., followed by stirring the resultant reaction mixture for 30 minutes and refluxing the reaction mixture over one night. However, the reaction was incomplete, so that 76.5 g (0.56 mol) of $K_2CO_3$ and 61.7 g (0.49 mol) of $(CH_3O)_2SO_2$ were further added to the reaction mixture. The resultant mixture was refluxed for 4 hours. Then, the reaction mixture was cooled down to room temperature and then was filtered to remove salts and to retrieve the filtrate. The filtrate was concentrated under a reduced pressure to remove acetone from the filtrate, and then was extracted with a chloroform-NaHCO₃ aqueous solution. The extracted organic phase was dehydrated with MgSO₄ and then was concentrated under a reduced pressure to obtain 85.2 g (yield 991) of a green solid of a compound 2 (2-methoxy-1-naphthaldehyde).

To 85.2 g (0.46 mol) of the compound 2 (2-methoxy-1-naphthaldehyde), 260 mL of ethanol, 260 mL of water and 49.0 g (1.23 mol) of NaOH were added and then to the resultant mixture, 37.5 g (0.54 mol) of NH₂OH—HCl was gradually added. Then, the resultant reaction mixture was stirred at room temperature for 1 hour and then was filtered to obtain 90.5 g (yield 92%) of a yellow powder of a compound 3 (2-methoxy-1-naphthaldehydeoxime).

To 2.00 g (9.94 mmol) of the compound 3 (2-methoxy-1-naphthaldehydeoxime), 20 mL of water, 1.19 g (29.8 mmol) of NaOH and 20 mL of chloroform were added and then into the resultant reaction mixture, 2.38 g (14.9 mmol) of Br₂ was gradually dropped at 0° C. Then, the resultant reaction solution was stirred at room temperature for 30 minutes and then the reaction solution was extracted with chloroform-water. The extracted organic phase was dehydrated with MgSO₄ and then was concentrated under a reduced pressure to obtain 903 mg (yield 46%) of a brown solid of a compound 4 (2-methoxynaphthyl-1-nitrile oxide).

[Chemical Formula 4]

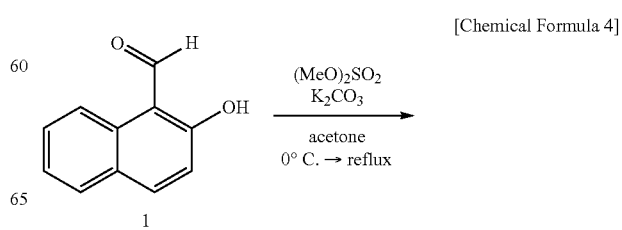

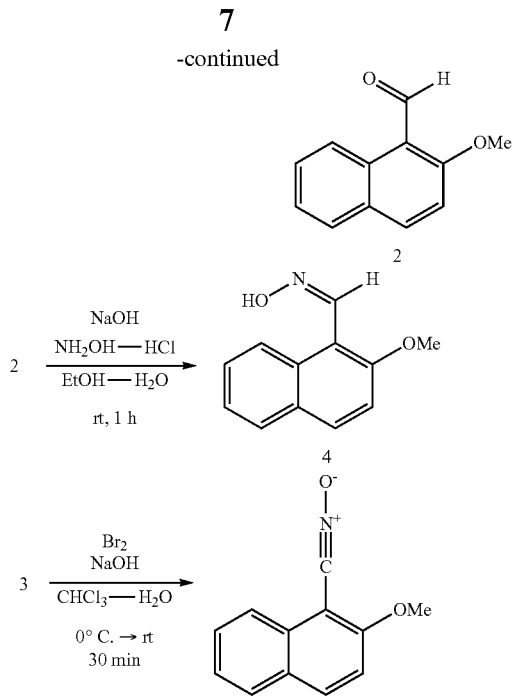

As the halogenated aldoxime used in Comparative Examples, α-benzaldoxime chloride (A) of Chemical Formula shown below was used.

[Chemical Formula 5]

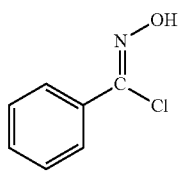

Next, Examples will be described.

In Example 1, PAN was dissolved in a solvent of DMF (N,N-dimethylformamide), and to the resultant solution, 2.0 equivalents of 2,6-dimethoxybenzonitrile oxide (which may be abbreviated as B hereinafter) as the aromatic nitrile oxide derivative was added, followed by stirring the resultant reaction mixture at a temperature of 100° C. for 48 hours to effect the reaction.

In Example 2, the reaction was effected under substantially the same conditions as in Example 1, except that the temperature (which may be called as reaction temperature hereinafter) at which the reaction is effected was changed to 150° C.

In Example 3, the reaction was effected under substantially the same conditions as in Example 1, except that the reaction temperature was changed to 70° C.

In Example 4, the reaction was effected under substantially the same conditions as in Example 3, except that 2,6-diethoxybenzonitrile oxide (which may be abbreviated as C hereinafter) was used as the aromatic nitrile oxide derivative.

In Example 5, the reaction was effected under substantially the same conditions as in Example 3, except that 2-methoxynaphthyl-1-nitrile oxide (which may be abbreviated as D hereinafter) was used as the aromatic nitrile oxide derivative.

In Example 6, NBR was dissolved in a solvent of CHCl$_3$ (chloroform) and to the resultant reaction solution, 1.2 equivalents of B was added, followed by stirring the resultant reaction mixture at a temperature of 70° C. for 24 hours to effect the reaction. Here, this reaction is shown in the following Chemical Formula 6.

In Example 7, the reaction was effected under substantially the same conditions as in Example 6, except that the time (which may be called as reaction time hereinafter) that the reaction mixture is stirred or mixed to effect the reaction was changed to 2 hours.

In Example 8, the reaction was effected under substantially the same conditions as in Example 6, except that the additive amount of B and the reaction time were changed to 0.67 equivalents and 48 hours, respectively.

In Example 9, the reaction was effected under substantially the same conditions as in Example 8, except that the additive amount of B was changed to 0.33 equivalents.

In Example 10, 1.2 equivalents of B were added to NBR in a mortar without using a solvent and in an air atmosphere and the resultant reaction mixture was mixed under pressure at a temperature of 70° C. for 2 hours to effect the reaction.

In Example 11, the reaction was effected under substantially the same conditions as in Example 10, except that the reaction temperature was changed to 100° C.

In Example 12, the reaction was effected under substantially the same conditions as in Example 6, except that C was used as the aromatic nitrile oxide derivative and the reaction time was changed to 48 hours.

In Example 13, the reaction was effected under substantially the same conditions as in Example 10, except that C was used as the aromatic nitrile oxide derivative.

In Example 14, the reaction was effected under substantially the same conditions as in Example 12, except that D was used as the aromatic nitrile oxide derivative.

[Chemical Formula 6]

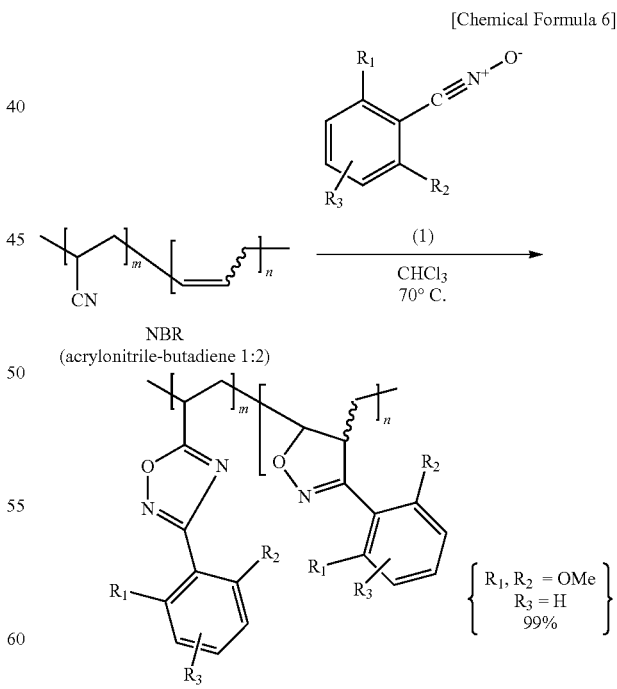

In Example 15, NR was dissolved in a solvent of CHCl$_3$ and to the resultant solution, 2.0 equivalents of B was added, followed by stirring the resultant reaction mixture at a temperature of 70° C. for 48 hours to effect the reaction.

In Example 16, EPDM was dissolved in a solvent of CHCl₃ and to the resultant solution, 1.0 equivalent of B was added, followed by stirring the resultant mixture at a temperature of 70° C. for 84 hours to effect the reaction.

In Example 17, 2.0 equivalents of B was added to EPDM in a mortar without using a solvent and in an argon gas (Ar) atmosphere. The resultant mixture was mixed under pressure at room temperature (RT: about 25° C.) for 2 hours without heating to effect the reaction.

In Example 18, 0.95 equivalents of B was added to EPDM without using a solvent and in a nitrogen gas (N₂) atmosphere, and the resultant mixture was stirred using a twin-screw kneader, in which the temperature inside the vessel is 70° C. (the inside of the vessel is also filled with nitrogen gas), for 1 hour to effect the reaction.

In Example 19, the reaction was effected under substantially the same conditions as in Example 16, except that 10 equivalents of D was added as the aromatic nitrile oxide derivative and the reaction temperature was changed to 48 hours.

Next, Comparative Examples will be described.

In Comparative Example 1, PAN was dissolved in a solvent of DMF, and to the resultant solution, 2.0 equivalents of α-benzaldoxime chloride (which may be abbreviated as A hereinafter) as a precursor of a nitrile oxide and Et₃N (triethylamine) as an additive were added, followed by stirring the resultant mixture at room temperature (RT: about 25° C.) without heating for 48 hours to effect the reaction.

In Comparative Example 2, the reaction was effected under substantially the same conditions as in Comparative Example 1, except that the reaction temperature was changed to 100° C.

In Comparative Example 3, the reaction was effected under substantially the same conditions as in Comparative Example 1, except that an MS4A (molecular sieve 4A) was used as an additive.

In Comparative Example 4, the reaction was effected under substantially the same conditions as in Comparative Example 2, except that the MS4A was used as an additive.

In Comparative Example 5, NBR was dissolved in a solvent of CHCl₃, and to the resultant solution, 2.0 equivalents of A and Et₃N as an additive were added, followed by stirring the resultant mixture at a temperature of 70° C. for 48 hours to effect the reaction.

In Comparative Example 6, the reaction was effected under substantially the same conditions as in Example 1, except that the reaction temperature was room temperature (RT: about 25° C.).

(1) Modifying Rate

The modifying rate, that is, the rate with which a nitrile oxide was added to carbon-carbon double bonds and nitrile groups in the polymer material was calculated from the results of an IR measurement, a 1H NMR measurement and a 13C NMR measurement. Accordingly, 100% of the modifying rate indicates that a nitrile oxide is added to all of carbon-carbon double bonds and nitrile groups in the polymer material. 50% of the modifying rate indicates that a nitrile oxide is added to the half of carbon-carbon double bonds and nitrile groups in the polymer material.

(2) Yield

The theoretical yield was obtained from the modifying rate obtained as described above and the ratio of an actual yield relative to the theoretical yield was calculated according to the following equation:

Yield=(actual yield/theoretical yield)×100(%).

As shown in Table 1, in every Example, the modifying rate was not 0, that is, a nitrile oxide was added to the polymer material, which allowed the polymer material to be modified by a nitrile oxide and to obtain a modified polymer material. In addition, changing reaction conditions allowed the modifying rate to be changed.

In Examples 10, 11, 13, 17 and 18, the modification by a nitrile oxide was capable of being performed even under a condition of using no solvent (without a solvent).

On the contrary, in every Comparative Example, the modifying rate was 0%, so that a nitrile oxide was not capable of being reacted with (added to) the polymer material.

Next, the solubility of each of the modified polymer materials obtained in Examples 3, 5, 6, 14 to 16, and 19 in seven types of organic solvents was measured and the results of the measurement are shown in Table 2. Seven types of organic solvents were acetone, chloroform, diethyl ether, toluene, methanol, hexane and DMF (N,N-dimethylformamide). Here, for the reference, the solubility of each of the polymer materials before the modification in an organic solvent was measured and the results of the measurement are shown in Table 2.

TABLE 2

|  | acetone | chloroform | diethyl ether | toluene | methanol | hexane | DMF |
|---|---|---|---|---|---|---|---|
| PAN | ○ | ○ | ○ | ○ | ○ | ○ | X |
| Example 3 | ○ | X | ○ | ○ | ○ | ○ | X |
| Example 5 | Δ | Δ | ○ | ○ | ○ | ○ | X |
| NBR | X | X | X | ○ | ○ | ○ | Δ |
| Example 6 | ○ | Δ | ○ | ○ | ○ | ○ | X |
| Example 14 | Δ | X | ○ | ○ | ○ | ○ | X |
| NR | ○ | X | X | X | ○ | ○ | X |
| Example 15 | X | X | X | ○ | ○ | ○ | X |
| EPDM | ○ | X | X | X | ○ | X | ○ |
| Example 16 | ○ | X | X | X | ○ | Δ | ○ |
| Example 19 | ○ | Δ | ○ | Δ | ○ | ○ | ○ |

(3) Solubility

The solubility was evaluated as follows by a method including: preparing each sample mixture by mixing each sample with each solvent so that the ratio of sample/solvent becomes 3 mg/mL; leaving the mixture stand still at room temperature for about 12 hours; and inspecting with the naked eye the solubility of each sample.

○: Not dissolved
Δ: Dissolved in a small amount
x: Dissolved

As shown in Table 2, the solubility of the modified polymer material in various solvents was markedly changed from that of the unmodified polymer material, because the polymer material was modified in such a manner that by nitrile oxide, sites of carbon-carbon double bonds in the molecule were converted into isoxazoline groups and sites of nitrile groups were converted into oxadiazoles.

As described above, according the present Example, modifying (chemically modifying) with a nitrile oxide enables the solubility of the polymer material in various solvents to be changed.

In addition, NBR, NR and EPDM can enhance the resistance to sunlight or ozone by reducing the number of carbon-carbon double bonds in the molecules, which can also enhance the weatherability.

Further, by controlling the modifying rate with the reaction condition, a modified polymer material having desired weatherability and desired solubility in a solvent can be obtained.

Here, the present invention is not limited to the above Examples and can also be embodied by accordingly varying the above Examples within a range not departing from the purpose of the present invention.

The invention claimed is:

1. A production method of a modified polymer material produced by modifying a polymer material having in a molecule thereof a multiple bond that reacts with a nitrile oxide, the production method comprising:
   reacting the polymer material with an aromatic nitrile oxide derivative having a substituent at an ortho-position of a nitrile oxide group of an aromatic nitrile oxide in which the nitrile oxide group is bonded to an aromatic ring,
   wherein the aromatic nitrile oxide derivative has only one nitrile oxide group and the reacting excludes use of a solvent.

2. The production method of a modified polymer material according to claim 1, wherein the aromatic nitrile oxide is one of benzonitrile oxide and naphthylnitrile oxide.

3. The production method of a modified polymer material according to claim 1, wherein the substituent group includes one of an alkyl group and an alkoxy group.

4. The production method of a modified polymer material according to claim 1, wherein the polymer material is one of PAN, NBR, NR and EPDM.

5. The production method of a modified polymer material according to claim 1, wherein the reaction process is performed in a kneading apparatus.

6. A modified polymer material produced by modifying a polymer material having in a molecule thereof a multiple bond that reacts with a nitrile oxide, with an aromatic nitrile oxide derivative having a substituent at an ortho-position of a nitrile oxide group of an aromatic nitrile oxide in which the nitrile oxide group is bonded to an aromatic ring,
   wherein the aromatic nitrile oxide derivative has only one nitrile oxide group and the modifying of the polymer material is performed without using a solvent.

7. The modified polymer material according to claim 6, wherein the aromatic nitrile oxide is one of benzonitrile oxide and naphthylnitrile oxide.

8. The modified polymer material according to claim 6, wherein the substituent includes one of an alkyl group and an alkoxy group.

9. The modified polymer material according to claim 6, wherein the polymer material is one of PAN, NBR, NR and EPDM.

* * * * *